UNITED STATES PATENT OFFICE.

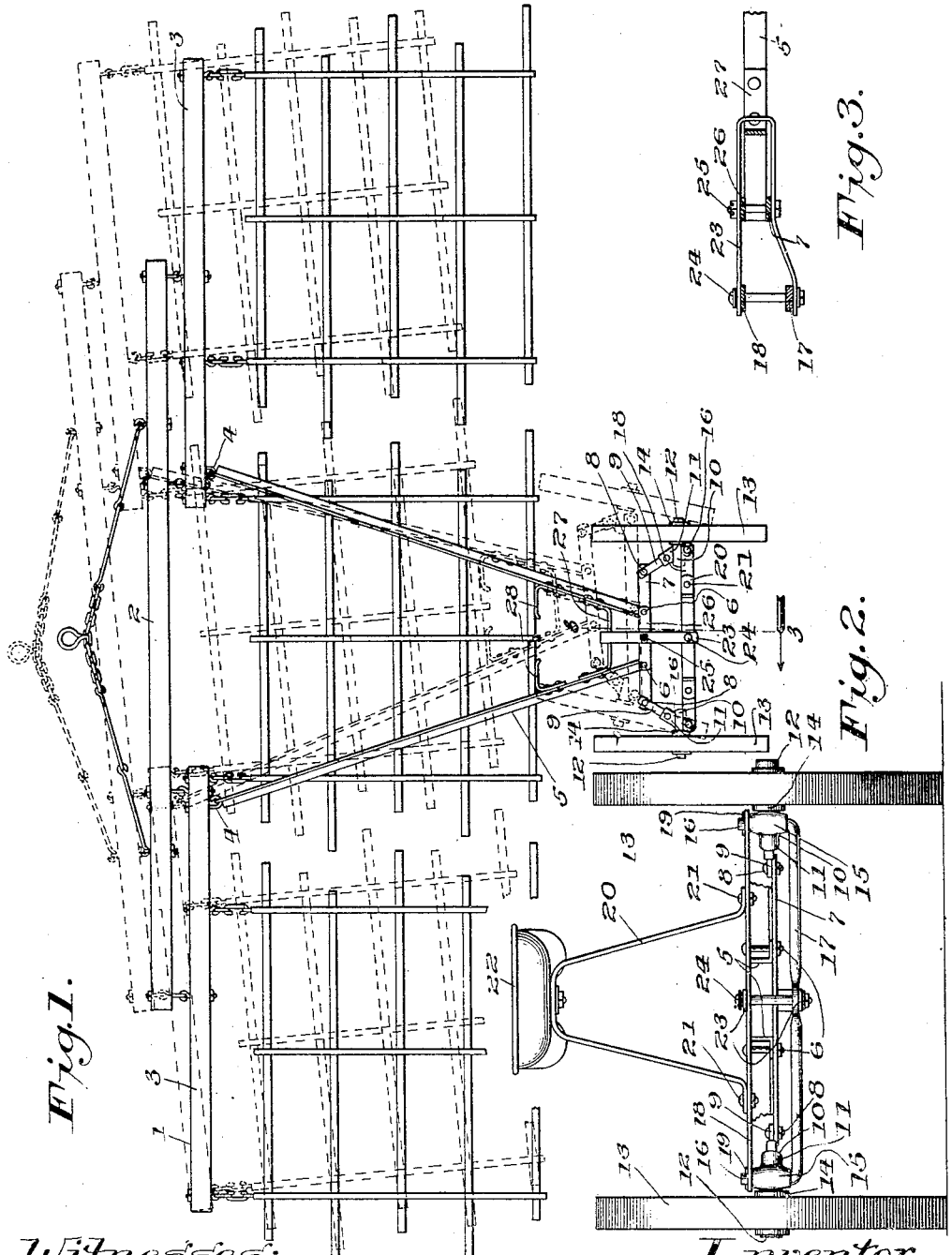

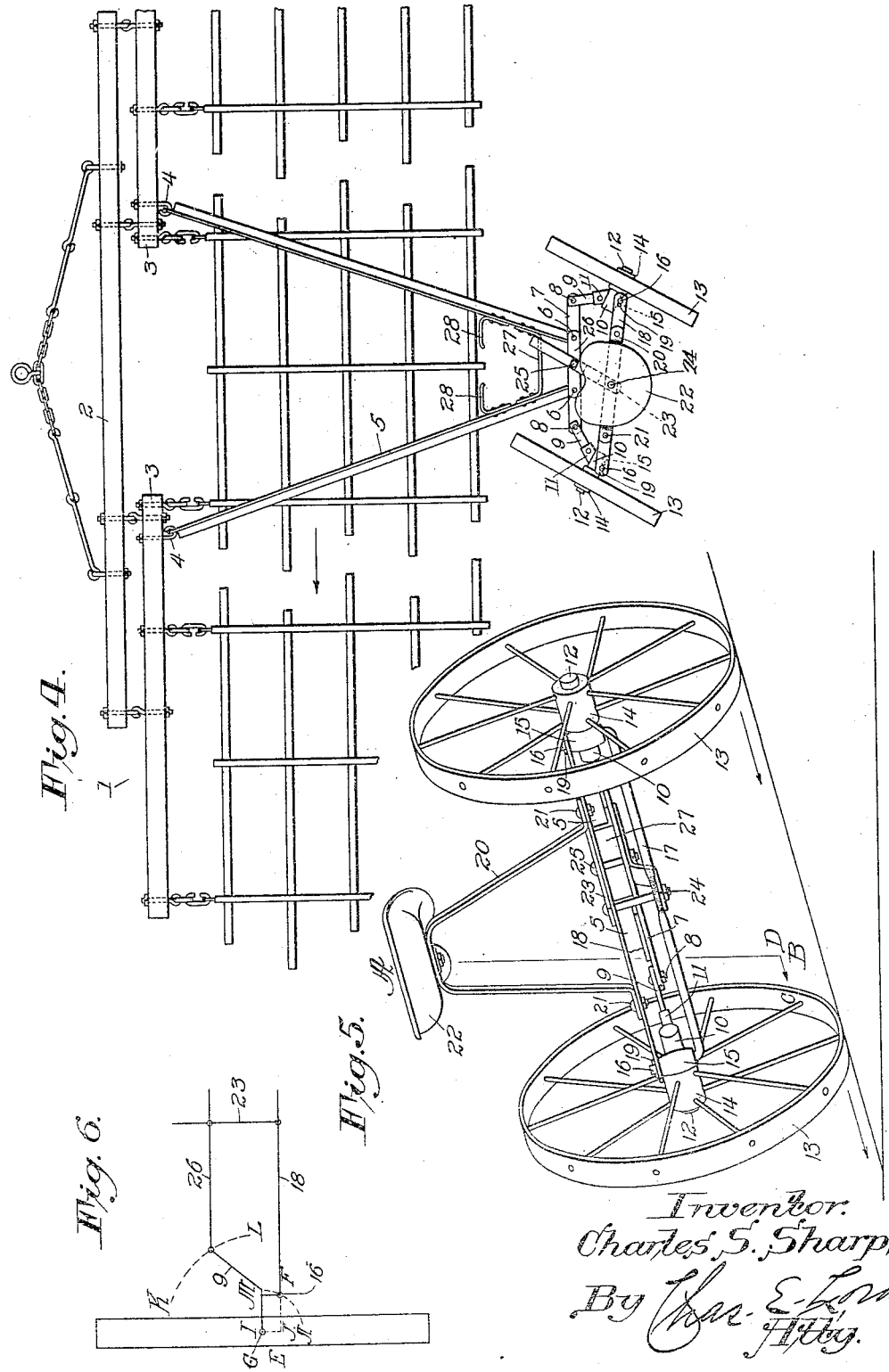

CHARLES S. SHARP, OF AUBURN, NEW YORK, ASSIGNOR TO INTERNATIONAL HARVESTER COMPANY OF NEW JERSEY, A CORPORATION OF NEW JERSEY.

RIDING ATTACHMENT FOR HARROWS AND THE LIKE.

1,257,407.     Specification of Letters Patent.     Patented Feb. 26, 1918.

Application filed August 27, 1913, Serial No. 786,961. Renewed December 10, 1915. Serial No. 66,219.

*To all whom it may concern:*

Be it known that I, CHARLES S. SHARP, a citizen of the United States, residing at Auburn, in the county of Cayuga and State of New York, have invented certain new and useful Improvements in Riding Attachments for Harrows and the like, of which the following is a full, clear, and exact specification.

My invention relates to riding attachments for harrows and the like.

It has for its object to provide a riding attachment of improved and simplified construction. A further object of my invention is to provide a riding attachment especially adapted to use on side hills, which is automatically maintained in the desired relation to the harrow and team as the harrow tends to slide downward on the side hill. I attain these objects by the provision of an improved construction wherein the driver's weight is carried at points back of the axles of the riding attachment, and these axles are operatively connected to the harrow in such an improved manner that the wheels of the riding attachment are automatically turned up the hill to maintain the riding attachment in the desired position as the harrow slides downward. These and other features of my invention are hereinafter described.

In the accompanying drawings I have shown one embodiment which my invention may assume in practice. It is to be understood, however, that the form shown herein for purposes of illustration may be modified without departing from the spirit of my invention.

Figure 1 is a top plan view of a harrow equipped with this form of riding attachment. the position of the parts in turning at the end of a field being shown in dotted lines.

Fig. 2 is a rear elevation of the riding attachment.

Fig. 3 is a detail view taken substantially on line 3—3 of Fig. 1 showing the locking mechanism.

Fig. 4 shows a plan view of a harrow and attachment embodying my invention, with the parts in the position normally occupied on the side of a hill;

Fig. 5 shows a rear elevation of the riding attachment on a side hill; and

Fig. 6 shows a diagram illustrating the action of the forces tending to turn the wheels of the cart up-hill when the device is being operated on a side hill.

In the construction shown I have illustrated diagramatically a harrow 1 of the peg tooth type provided with suitable draft connections 2 and formed of a plurality of units flexibly connected to the ends of the draft member 2 through intermediate draft members 3. The riding attachment hereinafter described is trailed at the rear of this harrow.

Pivotally connected at their front ends to the inner ends of the members 3 through any suitable flexible connections, such as eye bolts 4, is a plurality of forwardly extending diverging draft members 5 of this riding attachment. The rear ends of these draft members are rigidly connected at 6 at points intermediate the ends of a transverse frame member 7. This frame member 7 is pivotally connected at its ends at 8 to the front ends of a pair of short converging links which are integrally connected to the stub axle members 10 of the riding attachment. As shown, these axle members 10 are provided with forwardly and inwardly projecting integral arms 11 to which the links 9 are fixed, and are provided with laterally extending portions 12 of reduced diameter and cylindrical cross section on which wheels 13 of the riding attachment are rotatably mounted. At a point in the rear of the body of the axle members 10 and adjacent the hubs 14 of the wheels 13, upstanding rearwardly protruding lugs or extensions 15 are provided on these axle members having vertical bores therein adapted to receive and form bearings for upstanding projections 16 on the opposite ends of a transversely extending rod 17. The upper ends of the projections 16 on this rod, which protrude through the lugs 15, are attached to a flat seat supporting member 18 by means of cotter pins 19. It is to be noted that the seat supporting member 18 is disposed in a plane above the connecting rod 17 parallel thereto and that a seat support 20 is carried on the upper surface thereof and attached thereto at points intermediate its ends by suitable bolts 21, a seat 22 being carried on the top of the seat support 20 in the usual manner. It is to be noted that in this construction the weight of the operator is carried at a point back of the axles 10 so that the tendency of the operator's weight when operating on a side hill is to cause the wheels 13 to swing up the hill toward the position shown in Fig. 4, the operator thus being maintained in the desired relation with respect to the team and the harrow. As shown in Fig. 5, when the cart is being operated on a hillside, laterally inclined, the center of the weight of the driver, represented by lines A—B, falls to one side of the central portion of the pivoted seat supporting bar 18. A downward and lateral thrust in the direction of the lines C—D is thus imparted to the pivotal points 16 of said seat supporting bar. The resulting action is as shown in the diagram in Fig. 6, where it will be seen that the force of the seat supporting bar, represented by the dotted lines E—F, falls to the rear of the center of the wheel or ground engaging center thereof, represented by the letter G. The seat supporting bar thereby has a leverage tending to turn the wheel uphill, the extent of this leverage being represented by the dotted line I—J. The end thrust of the bar 18 being thus transmitted to the wheel through the levers E—F and I—J, the wheel tends to turn about its ground center G, moving the axle arms 9 about the arcuate path K—L while the pivotal connection 16 is moved through the path M—N. Such is the theory of operation of the automatic guiding of the harrow cart. However, in practice, it is only necessary to apply a lateral force to the wheels rearwardly of their ground engaging centers, and they immediately assume an up-hill direction. By thus maintaining the cart well upward on the hill, the driver is kept in a central line with the draft animals and a force is transmitted through the draft arms 5 to the draw beams 2 and 3, which will tend to hold them in right angular position with respect to the line of draft. The drag sections will thus be held against sliding down hill except to the limited extent permitted by the flexible link connections between each section and draft beam.

In order that when operating on level ground the operator may lock the riding attachment so that the wheels 13 will not readily swing laterally, but will be maintained in comparatively rigid relation with respect to the frame, I have provided an improved locking mechanism. This locking mechanism is shown to comprise a substantially U-shaped band 23 which is bolted at its rear ends by means of a bolt 24 to the connecting rod 17 and the seat supporting rod 18, the bolt extending through both of these rods, as shown in Fig. 3, at a point substantially half way between the ends thereof and directly under the operator's seat 22. The front end of this U-shaped locking member is adjustably pivoted by a bolt and lock-nut 25 to the front frame member 7 and to a supplemental frame member 26 which is rigidly connected to the inner ends of the draft members 5 in a plane above the member 7 by the same means which attach the inner ends of the draft members 5 thereto. The U-shaped end of the member 23 preferably protrudes between these draft members 5 and around a bracing member 27 rigidly connected between the same to stiffen the construction of the draft members; this bracing member also serving to limit the movement of the locking member. If desired this bracing member may be formed integral with one or more of a plurality of foot rests 28 located inside the draft members 5 and at a point in front and below the seat.

It is to be noted that the construction illustrated is entirely automatic in its action, the weight of the operator acting automatically to swing the wheels as the harrow strikes the side hill and maintain the operator in the desired relation with respect to the harrow and the team. When the cart is being operated on level ground, the lock-nut or bolt 25 may be so adjusted that the wheels will not respond to slight changes in the inclination of the ground such as would be caused by ridges or ditches, but in turning at the end of the field will yield to permit the wheels to angle as shown in dotted lines in Fig. 1. When, however, the cart is being used on a hillside, the locking mechanism may be so loosened that it will in no wise restrict a free movement of the wheels as is desirable in order that the weight of the driver may control the pivotal action thereof. This same U-shaped strap 23, because of its swinging movement, may obviously be utilized as a support for a forwardly extending seat bracing member (not shown), after the manner shown in some of my prior patents, notably No. 907,185, December 22, 1908. It is also to be noted that the construction is exceedingly simple and rugged and that due to the location of the operator's weight, no strains are placed upon the same tending to produce warping in service, and that the drag upon the team is minimized.

While I have in this application described one embodiment which my invention may assume in practice, it is to be understood, of course, that the form shown herein for purposes of illustration is susceptible of modifications without departing from the spirit of my invention.

What I claim as my invention and desire to secure by Letters Patent is:

1. In a riding attachment, a draft frame, a wheeled frame pivotally connected at the rear thereof, and a seat support pivotally supported on said wheeled frame at points in the rear of the wheel axles.

2. In a riding attachment, a draft frame, rearwardly extending members pivotally attached thereto, wheels journaled thereon, and a seat support pivotally connected to each of said wheels at a point in the rear of the axis thereof.

3. In a riding attachment, a draft frame, rearwardly extending members pivotally attached thereto, wheels journaled thereon, a connecting rod pivotally connected to each of said wheels at a point in the rear of the axis thereof, and a seat carried on said connecting rod.

4. In a riding attachment, a draft frame, a plurality of spaced axle members, converging links rigidly attached at their rear ends to said axle members and pivotally attached at their front ends to said draft frame, and a seat support supported by said axle members and pivotally attached thereto at points in rear of the axes thereof.

5. In a riding attachment, a draft frame, rearwardly extending members pivotally attached thereto, wheels journaled on said members, a seat support pivotally connected to said wheels at points in rear of the axes thereof, and means for adjustably locking said draft frame and said seat support.

6. In a riding attachment, a draft frame, rearwardly extending members pivotally attached thereto, wheels journaled on said members, a seat support pivotally connected to said wheels at points in rear of the axes thereof, and a locking member adjustably connected to said draft frame and operatively connectible with said seat support.

7. In a riding attachment, a draft frame, rearwardly extending members pivotally attached thereto, wheels journaled on said members, a seat support pivotally connected to said wheels at points in rear of the axes thereof, and a U-shaped locking member having its bowed end pivotally connected to said draft frame, and its open end connected with said seat support.

8. In a riding attachment, a draft frame, rearwardly extending members pivotally attached thereto, wheels journaled on said members, a seat support pivotally connected to said wheels at points in rear of the axes thereof, and a longitudinally disposed locking member extending rearward between said members, having one end thereof adjustably connected to said draft frame and its opposite end operatively connected to said seat support at a point intermediate the ends of the latter.

9. In a riding attachment, a draft frame comprising forwardly protruding draft members and a transverse frame member rigidly connected to their rear ends, stub axle members, rearwardly extending links pivotally connected at their front ends to said transverse frame member and rigidly attached at their rear ends to said stub axle members, and a seat support connecting said axle members pivoted thereto at points in rear of said axles.

10. In combination, a draft device, a series of drag sections drawn thereby, and a separate unit including a riding cart connected to said draft device, said cart being in form to exert an upward force on said draft device when in operation on a laterally inclined plane.

11. In combination, a draft beam, a series of drag sections drawn thereby, and a separate unit including a wheeled riding attachment connected with said draft beam, and means operated by the weight of the driver for angling the wheels of said attachment in an uphill direction when the device is in operation on a laterally inclined plane.

12. In combination, a draft beam, a series of drag harrows drawn thereby, and a separate unit including a wheeled riding attachment connected to said draft beam and carried in the rear of said harrows, and means operated by the driver's weight for preventing the attachment from running down hill when the device is in operation on a laterally inclined plane.

13. In combination, draft beams, a series of drag harrows drawn thereby, and a separate unit including rearwardly extending draft bars connected with said beams, a wheeled riding attachment connected to said draft bars in the rear of the harrows, and means operated by the driver's weight for angling the wheels in an uphill direction when the device is in operation on a laterally inclined plane.

14. In a riding attachment for harrows, a separate unit including pivoted wheels, and a seat having connections with said wheels whereby the driver's weight on an inclined plane will cause the wheels to angle in an uphill direction.

15. In a riding attachment for harrows, a separate unit including forwardly extending bars, wheels pivotally connected thereto whereby they may move freely in turning corners, and a seat having connections with said wheels whereby the driver's weight on a laterally inclined plane will cause the wheels to angle in an uphill direction.

16. In combination, a draft device carrying drag sections and adapted to be drawn by draft animals, and a separate unit including a wheeled riding attachment pivotally carried in the rear of said drag sections, and means for automatically maintaining said riding attachment in line with the draft animals on a laterally inclined plane.

17. In combination, draft beams, drag sections drawn thereby, rearwardly converging draft bars connected to said draft beams, cart wheels pivotally connected to said draft bars at the rear ends thereof, and automatic means for preventing said wheels from moving down hill when the device is in operation on a lateral incline.

18. In combination, draft beams, drag sections drawn thereby, rearwardly converging draft bars connected to said draft beams, cart wheels pivotally connected to said draft bars at the rear ends thereof, a seat carried by said wheels, and automatic means for controlling said wheels on a lateral incline.

19. In combination, draft beams, drag sections drawn thereby, rearwardly converging draft bars connected to said draft beams, a wheeled riding attachment pivotally connected to said draft bars at the rear ends thereof, means operated by the driver's weight for controlling the pivotal action of said wheels on a lateral incline, and adjustable locking means for yieldably holding said wheels normally in alinement with the direction of draft.

20. In a riding attachment for harrows, a draft frame, rearwardly extending members pivotally attached thereto, wheels journaled on stub axles carried by said members, a transverse rod provided with ends carried in bearings on said stub axles, and a seat support connected to the ends of said rod.

21. In a riding attachment for harrows, a draft frame, rearwardly extending members pivotally attached thereto, wheels journaled on stub axles carried by said members, a transverse rod provided with upturned ends carried in vertical bearings on said stub axles, a connecting bar above said bearings carried on the projecting ends of said transverse rod, and a seat supported by said connecting bar.

22. In a riding attachment, a draft frame comprising diverging forwardly protruding draft members and a transverse frame member rigidly connecting their rear ends, stub axle members, diverging rearwardly extending links pivotally connected at their front ends to said transverse frame member at points outside the points of connection of said draft members and rigidly attached at their rear ends to said stub axle members, a rod connecting said axle members pivoted thereto at points in rear of said axles and a seat supported on said rod at a point intermediate said axle members.

23. In a riding attachment, a draft frame comprising diverging forwardly protruding draft members and a transverse frame member rigidly connecting their rear ends, stub axle members, diverging rearwardly extending links pivotally connected at their front ends to said transverse frame member at points outside the points of connection of said draft members and rigidly attached at their rear ends to said stub axle members, a rod connecting said axle members pivoted thereto at points in rear of said axles, a seat supported on said rod at a point intermediate said axle members, and means for limiting the movement of said axle members relative to said frame.

24. In a riding attachment, a draft frame comprising diverging forwardly protruding draft members and a transverse frame member rigidly connecting their rear ends, stub axle members, diverging rearwardly extending links pivotally connected at their front ends to said transverse frame member at points outside the points of connection of said draft members and rigidly attached at their rear ends to said stub axle members, a rod connecting said axle members pivoted thereto at points in rear of said axles, a seat supported on said rod at a point intermediate said axle members, and a locking member pivotally connected between said connecting rod and said transverse frame member adjustable to limit the movement of said axle members relative to said draft frame.

25. In combination, a draft device, ground treating means drawn thereby, and a separated unit including a riding cart and draft members connected to said draft device and rigidly connected to the wheeled cart and to each other, said cart being in form to exert an upward force on said draft device when in operation on a laterally inclined plane.

In testimony whereof I affix my signature, in the presence of two witnesses.

CHARLES S. SHARP.

Witnesses:
H. J. McMahon,
Robert K. Forth.

Copies of this patent may be obtained for five cents each, by addressing the "Commissioner of Patents, Washington, D. C."